Patented Feb. 12, 1935

1,991,096

UNITED STATES PATENT OFFICE 1,991,096

HYDROGENATION CATALYST

Carey B. Jackson, Chicago, Ill., assignor to Catalyst Research Corporation, Baltimore, Md., a corporation of Maryland No Drawing. Application July 30, 1934,
Serial No. 737,572

11 Claims. (Cl. 87—12)

This invention relates to catalysts, more particularly to catalysts for hydrogenation in the liquid phase.

The major object of the invention is to provide supported hydrogenation catalysts, especially of nickel, characterized by high activity and capable of effecting unusually profound hydrogenation of unsaturated fatty oils.

It has been shown by Owen G. Bennett in Patent No. 1,893,155, issued January 3, 1933, that supported nickel catalysts which are especially desirable for hydrogenation in the liquid phase, e. g. of oils, are produced by reduction of compounds corresponding in composition to nickel chromites, to provide metallic nickel in highly active catalytic form intimately associated with chromium oxide, and perhaps with unreduced nickel chromite. In the practice of that invention a nickel chromite is prepared in a suitable manner, as by simple heating of a nickel chromate, and the chromite is then reduced in hydrogen at an elevated temperature. According to the patent the most advantageous results are obtained by the chromites formed from precipitated nickel ammonium chromates. The catalysts prepared in accordance with the invention of that patent are characterized by the ability to effect substantially improved hydrogenation of oils as compared with the catalysts theretofore available and capable of commercial application, being capable, for example, of hardening cottonseed oil to an iodine number of about 30 using hydrogen at atmospheric pressure. Those catalysts represent a very substantial advance in the hydrogenation art, and they are capable of satisfactorily performing in accordance with the disclosure of the patent.

Patent No. 1,905,433, issued April 25, 1933 on an application filed by the said Owen G. Bennett and the present applicant, discloses the fact that the activity of such nickel catalysts may be enhanced very substantially by the use of sulfur, and that such sulfur-activated catalysts are capable of hydrogenating oils to a much greater extent, it being possible thereby to effect almost complete saturation, which is desirable for commercial reasons.

I have now discovered, and it is upon this that the present invention is predicated, that catalysts of the type disclosed in the aforesaid Bennett Patent No. 1,893,155 may be greatly improved as to their activity by the use of certain restricted amounts of selenium or tellurium. Thereby the catalysts are rendered capable of effecting much more profound hydrogenation of fatty oils and the like than those prepared without the use of these two elements. For instance, catalysts made in accordance with the aforesaid Bennet patent cause cottonseed oil to be hydrogenated to an iodine number of about 30, whereas with catalysts produced in accordance with this invention the iodine number may be reduced to about 4 or 5.

The belief in the hydrogenation art has been that selenium and tellurium prejudicially affect, and usually destroy, the activity of hydrogenation catalysts, and that even infinitesimal amounts of them exert such detrimental action. Contrary to those beliefs, however, I have discovered that within certain limits, presently to be defined, the use of selenium and tellurium is actually and very substantially beneficial to the activity of nickel catalysts prepared by reduction of nickel chromites. In other words, selenium and tellurium apparently superactivate the already highly active catalysts made by that procedure. Various compounds of these two elements may be used for the purposes of this invention.

In the practice of the invention the nickel chromates used may be prepared in various ways, as by reaction in solution of nickel salts and chromic acid, or soluble dichromates, to provide solutions of nickel chromates. Upon evaporating such a solution to dryness and heating the residual chromate is converted to chromite, which may then be reduced at an elevated temperature with hydrogen to prepare the desired catalyst.

Most advantageously, however, the chromates are prepared by precipitation, especially of nickel ammonium chromates. These precipitated chromates appear to be in a physical condition which favors particularly high activity, and the driving off of ammonia in converting the chromate to chromite may contribute to this. One such chromate may be made by reaction of two mols of ammonium chromate and one mol of nickelous nitrate in cold aqueous solution. This reaction produces a yellowish-greenish precipitate which appears to have the empirical formula

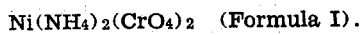 $Ni(NH_4)_2(CrO_4)_2$ (Formula I).

This compound loses oxygen and ammonia when heated, and it is converted thereby to a compound having the empirical formula $NiCr_2O_4$, i. e. a nickel chromite. Reduction of the chromite with hydrogen converts it to metallic nickel supported upon chromium oxide, or if the reduction is not complete, on chromium oxide and unreduced chromite. The ratio of nickel to chromium in the catalyst is 1:2.

Most suitably, however, there is used a precipitated chromate of the empirical formula $Ni_2O(NH_4)_2(CrO_4)_2$   (Formula II).

This latter compound forms the compound $Ni_2Cr_2O_5$, also presumably a chromite, from which it will be seen that in the resultant reduced catalyst the ratio of nickel to chromium is 1:1. This affords a high proportion of catalytic nickel per unit weight of supporting substance, which is obviously desirable. Also, this catalyst is, in general, more active than that made by the $NiCr_2O_4$ procedure just referred to.

The catalysts prepared in these and related manners form the basis of the catalysts provided by this invention. As illustrative of the preferred procedure, there may be reacted 1 mol of nickelous nitrate with 1 mol of chromic anhydride and 3 mols of ammonium hydroxide to precipitate the double chromate represented by Formula II. The chromic acid anhydride and nickel salt are dissolved to form a concentrated aqueous solution, and commercial ammonium hydroxide in amount equal to 3 mols of $NH_4OH$ is added thereto while stirring rapidly. The chromate appears as a very fine brick red precipitate. Ammonium chromate and nickel nitrate may be used in suitable proportions to form the same compound, but the solubility of ammonium chromate is such that concentrated solutions can not be used, and in consequence the physical character of the resultant product is different from that obtained by the procedure just described, and the final product may be somewhat less active.

The red precipitate is filtered from the mother liquor, dried at about 100° C., and heated to 300 or 350° C., whereupon a large amount of gas is liberated, the compound being decomposed to the corresponding nickel chromite. The chromite is then reduced to form the catalyst by heating it slowly up to about 500° C. while passing a slow stream of hydrogen over it in a suitable container. This mode of reduction does not necessarily completely reduce all of the chromite, but it appears to provide the most active product. If the chromite is completely reduced the catalyst consists of nickel intimately associated with chromium sesquioxide, while if the reduction is not complete the product may combine some amount of unreduced chromite.

The belief in the art has always been that sulfur, selenium, and tellurium are powerful catalyst poisons, and it has been believed that the catalytic toxicity of these metalloids increases with their atomic weight, i. e. that sulfur, while a strong poison is nevertheless the least harmful of the three. Thus it has been stated that while traces of S have a poisoning action, mere faint traces of Se and Te suffice to paralyze activity, whence it may be concluded that they are more virulent than S. Also, sulfur is a transition element of Group VI, while selenium and tellurium are classed as sub-group B of that group, for which reason the latter two may be expected to possess somewhat different properties from sulfur, as they actually do. Thus their hydrides are less than that of sulfur. It might have been expected, therefore, that although sulfur could be used, as disclosed in Patent No. 1,905,433, to increase the activity of these reduction products of chromites, selenium and tellurium would be unsuitable for the purpose because of their stronger poisoning action. Actually, I have found that it is true that selenium and tellurium are poisons for these catalysts except within certain very narrow ranges in which they exert a most pronounced activating power. I have found also that there is a further distinction between selenium and tellurium, on the one hand, and sulfur on the other.

In the use of sulfur to activate these catalysts it was found that exact limits could not be set for the tolerable content of sulfur, it being stated in the patent that the exact amount of sulfur needed for the purposes of that invention, and the precise upper limit beyond which the results were attained, was not known. In fact improved catalysts are producible by using nickel sulfate as the sole source of nickel, which necessarily introduced a potentially large amount of sulfur into the solution, with the possibility of carrying large amounts into the precipitated chromate. On the other hand, I have found that as to selenium and tellurium there are very definite and apparently rather precisely fixed tolerable limits, both as to maximal and minimal amounts, of these activating elements, as will appear hereinafter, and that they are not tolerable in amounts at all equivalent to the amount of sulfur represented by nickel sulfate when used to supply all of the nickel needed to form the catalyst.

In the practice of the present invention a tolerable amount of selenium or tellurium is introduced into, or admixed with, the material used in the preparation of the catalyst, for example the chromate used for production of the chromite. This may be done by adding a compound of selenium or tellurium to the precipitate, or to the reacting solutions, for adsorption, for example, by the precipitated chromate.

As an example of the practice of this invention, reference may be had to the preparation of a catalyst from the chromate of Formula II, which constitutes the preferred embodiment, prepared from concentrated solution by the reaction $NiNO_3+CrO_3+3NH_4OH$ Thus, 290.8 grams of nickel nitrate ($NiNO_3.6H_2O$) and 100 grams of chromic acid ($CrO_3$) are dissolved in 200 cc of distilled water. The proper amount of selenium or tellurium compound, e. g. the dioxide, is added, and 3 mols of ammonium hydroxide (about 200 cc of the commercial solution) are quickly added to the solution while stirring rapidly. The precipitate is filtered, dried at 100° C., heated to convert it to chromite, e. g. at 300° to 350° C., followed by reduction at about 500° C., in hydrogen. Thus there is produced a catalyst of abnormally high activity, and of activity greater than that of a catalyst prepared in a similar manner without the use of selenium or tellurium.

The activity of the catalysts provided by this invention is quite dependent upon the amount of selenium or tellurium which is used, too much Se or Te giving a product which may be almost incapable of hydrogenating cottonseed oil, for example. And when too little is present the catalysts, while still very active, do not show the extreme activity which characterizes the invention. This may be shown best by actual examples, of which the following tests are characteristic. The catalysts shown in the tabulation were made in accordance with the foregoing example and used for the hydrogenation of cottonseed oil having an iodine number of about 110. Enough catalyst was added to the oil to provide 0.2175 per cent of nickel. The oil was heated to 180° C., and hydrogen at atmospheric pressure was passed in for 30 minutes while stirring at high speed. The data follow:

Wt. of $SeO_2$ per mol of $NiNO_3$: Iodine No. of oil
- 4 grams_____ 108.5
- 2 grams_____ 14.6
- 1 gram_____ 4.2
- .5 gram_____ 7.5

Wt. of $TeO_2$ per mol of Ni:
- 8 grams_____ 109.0
- 4 grams_____ 4.0
- 2 grams_____ 4.9
- 1 gram_____ 5.7
- .5 gram_____ 11.4

Same catalyst, no Se or Te_____About 30

These tests show that the catalysts are rendered completely inactive, or substantially so, if too much selenium or tellurium be present, there being a rather sharp break between amounts completely poisoning and amounts greatly increasing the normal activity. They show also how substantial is the improvement which flows from this invention, it being possible to substantially completely saturate the oil. This is significant because the hydrogenation was at atmospheric pressure, and because it is in the ranges of higher saturation that it is ordinarily difficult to improve activity of oil hydrogenation catalysts.

The exact amount of selenium or tellurium retained in the catalyst is not known, but the foregoing tabulation shows that there are upper limits for the tolerable amount of compound used beyond which the results are not obtained. Nor is the mechanism by which the selenium and tellurium activate these catalysts known, it being on the contrary, quite obscure.

It may be observed in this connection, however, that there is probably a further distinction between the sulfur activated catalysts of Patent No. 1,905,433 and those of this invention. In the sulfur activation procedure it is probable that the sulfur compound is removed almost completely in the mother liquor which remains after precipitation of the chromate, and upon washing the precipitate, so that only an infinitesimally small amount remains. Here, however, it is possible that the Se or Te compound is decomposed, liberating elemental metalloid which will, in large part at least, become admixed and remain in the chromate, and will follow through its subsequent treatment. This may explain why the tolerable amounts are so more definitely fixed in the present invention as compared with sulfur activation.

For the foregoing reasons the amount of selenium or tellurium compound used in the practice of the invention is referred to herein as being a "tolerable amount", by which is meant such amount of the compound as effects substantial activation of the catalyst, as compared with a catalyst prepared without the use of selenium or tellurium compounds. Obviously, the tolerable limit can not include amounts which decrease or do not increase the catalytic activity. Under the circumstances set forth I am unable to define the exact amounts of selenium or tellurium compound embodied in the invention in any other manner.

According to the provisions of the Patent Statutes, I have explained the principle of my invention, and have illustrated and described what I now consider to be its best embodiment. However, I desire to have it understood that, within the scope of the appended claims, the invention may be practiced otherwise than as specifically illustrated and described.

I claim:

1. The method of making a nickel catalyst adapted for hydrogenation of unsaturated fatty oils and the like, comprising heating a nickel chromate admixed with a tolerable amount of a compound of the group selenium and tellurium to convert the chromate to chromite, and reducing said chromite at an elevated temperature with hydrogen and thereby forming metallic nickel activated by said compound to a state of enhanced hydrogenation ability as compared with nickel catalyst prepared in the same way without the use of said compound.

2. The method of making a nickel catalyst adapted for hydrogenation of unsaturated fatty oils and the like, comprising heating a precipitated nickel ammonium chromate admixed with a tolerable amount of a compound of the group selenium and tellurium to convert the chromate to nickel chromite, and reducing said chromite at an elevated temperature with hydrogen to thereby form metallic nickel activated by said compound to a state of enhanced hydrogenation ability as compared with nickel catalyst prepared in the same way without the use of said compound.

3. A method according to claim 2, said nickel ammonium chromate corresponding to the formula $Ni_2O(NH_4)_2(CrO_4)_2$.

4. The method of making a nickel catalyst adapted for hydrogenation of unsaturated fatty oils and the like, comprising reacting a soluble nickel salt, a chromium compound and ammonia in the presence of an activating compound of the group selenium and tellurium to form precipitated nickel ammonium chromate containing a tolerable amount of said compound, heating said chromate to convert it to nickel chromite, and reducing said chromite at an elevated temperature with hydrogen and thereby forming metallic nickel activated by said activating compound to a state of enhanced hydrogenation ability as compared with nickel catalyst prepared in the same way without the use of said activating compound.

5. The method of making a nickel catalyst adapted for hydrogenation of unsaturated fatty oils and the like, comprising reacting a concentrated solution of a nickel salt and chromic acid with ammonia in the presence of a tolerable amount of a compound of the group selenium and tellurium to precipitate a compound corresponding substantially to $(Ni_2O)(NH_4)_2(CrO_4)_2$ and containing a tolerable amount of said compound, heating to convert said compound to nickel chromite, and reducing said chromite at an elevated temperature with hydrogen and thereby forming metallic nickel activated by said compound to a state of enhanced hydrogenation ability as compared with nickel catalyst prepared in the same way without the use of said compound.

6. A method according to claim 4, said compound being of selenium in an amount equivalent to between about 0.5 and 3 grams of $SeO_2$ per mol of nickel salt.

7. A method according to claim 5, said compound being of selenium in an amount equivalent to between about 0.5 and 3 grams of $SeO_2$ per mol of nickel salt.

8. A method according to claim 4, said compound being of tellurium in an amount equivalent to about 0.5 to 6 grams of $TeO_2$ per mol of nickel salt.

9. A method according to claim 5, said compound being of tellurium in an amount equivalent to about 0.5 to 6 grams of $TeO_2$ per mol of nickel salt.

10. The method of hydrogenating unsaturated oils and the like, comprising treating with hydrogen a mixture of the oil and a catalyst made by heating a nickel chromate admixed with a tolerable amount of compound of the group selenium and tellurium to convert the chromate, to chromite, and reducing said chromite at an elevated temperature with hydrogen to thereby form metallic nickel activated by said compound to a state of enhanced hydrogenation ability as compared with nickel catalyst prepared in the same way without the use of said compound.

11. A method of hydrogenating unsaturated oils and the like in which hydrogen is passed into a mixture of the oil and a catalyst prepared in accordance with claim 5.

CAREY B. JACKSON.